United States Patent [19]
Spier

[11] 3,950,483
[45] Apr. 13, 1976

[54] INJECTION MOLDING PROCESS

[76] Inventor: I Martin Spier, 50 Park Ave., New York, N.Y. 10016

[22] Filed: Mar. 8, 1974

[21] Appl. No.: 449,799

Related U.S. Application Data

[63] Continuation-in-part of Ser. No. 232,314, March 2, 1972, abandoned.

[52] U.S. Cl. ............... 264/328; 264/46.4; 264/245
[51] Int. Cl.² ........................................... B29F 1/12
[58] Field of Search ........... 264/232, 314, 328, 245, 264/4 C, 46, 245, 328

[56] References Cited
UNITED STATES PATENTS

| | | |
|---|---|---|
| 2,470,089 | 5/1949 | Booth .................................. 264/245 |
| 3,051,994 | 9/1962 | Carozzo ............................... 264/245 |
| 3,378,612 | 4/1968 | Dietz .................................... 264/45 |
| 3,763,293 | 10/1973 | Nussbaum ........................... 264/46 X |
| 3,769,380 | 10/1973 | Wiley ................................ 264/245 X |

Primary Examiner—Richard R. Kucia
Attorney, Agent, or Firm—Blum, Moscovitz, Friedman & Kaplan

[57] ABSTRACT

An injection molding process by which the characteristics of a product may be controlled by molding the product of two or more dissimilar melts by simultaneous injection of the dissimilar melts into the mold in such a manner that the dissimilar melts intermix at transitional zones to provide a one-piece construction with strong chemical and/or mechanical bonds at the transitional zones.

7 Claims, 10 Drawing Figures

INJECTION MOLDING PROCESS

CROSS REFERENCE TO RELATED APPLICATION

This application is a continuation-in-part of my copending application, Ser. No. 232,314, filed Mar. 2, 1972 now abandoned.

BACKGROUND OF THE INVENTION

The art of plastic molding and particularly injection molding has developed to a point of considerable sophistication. With improved technology, plastics have been developed with a wide variety of physical and chemical properties. Resins and molding compounds are available or may be modified to provide plastics which are rigid or flexible, brittle or impact resistant, soluble or resistant to solvents, clear or opaque, dense or expanded, etc. For any particular application, an expert in the art of plastic technology may select and/or tailor a resin or molding compound to the needs of the application.

It has been known to mold an article in which sections thereof are differently colored. Portions of the resin melt are isolated and color dyes are introduced therein prior to introduction into the mold. Alternatively, different color dyes have been introduced into the resin, per se. The isolated melt portions differ only to the extent that they are of different colors and the cured article produced therefrom is multicolored. The properties of the cured article are, however, substantially uniform throughout. A two-color sign or a typewriter key are typical examples. According to this known process, the differently colored melt portions must be separated along a sharply defined interface after introduction into the mold to avoid blurring and for sharp letter definition. To produce articles using a differently colored resin, one known technique is to first inject one colored melt portion into a mold and, after it cools and sets, inject the other differently colored melt portion therein so that the materials will be maintained separate, one from another. According to another known technique, the differently colored melt portions are simultaneously injected into the mold. Both known processes have as their end product an article with substantially uniform properties, except as the properties thereof may vary according to thickness variations therein. Neither known process provides an article with one or more selectively localized areas having preselected property characteristics which differ from characteristics of the main body of the article; nor do these known processes provide an article with a transition zone of intermediate characteristics between the localized area and the main body thereof.

SUMMARY OF THE INVENTION

Generally speaking, in accordance with the invention, a molding method is provided wherein a mold comprising contoured dies joined along a parting line and forming a generally hollow cavity has at least two injection stations each supplied with an injection barrel so as to permit simultaneous filling of the mold cavity with resin melt injected from the two or more barrels. At least one of the injection stations is located in the parting line of the joined dies, while the at least one other injection station is located in a plane substantially normal thereto.

The barrels are filled with different or dissimilar make-up resin melts and melt selection and make-up for each barrel is determined by the properties desired at a location of the cured article which corresponds to a respective mold injection station. The melt fill introduced into a barrel communicating with an injection port located in the parting line of the joined dies is defined as the "primary melt composition," since a major proportion of the molded article is constituted thereof. The melt fill introduced into a barrel communicating with an injection port located in a plane substantially normal to the parting line of the joined dies is defined as the "secondary melt composition," since only one or more localized areas thereof are in the molded article. More than one secondary melt composition may be employed. For instance, each barrel adapted to hold a fill of secondary melt composition may hold a different or dissimilar melt composition. The melts in the barrels are simultaneously injected into the mold cavity and, as the two or more melt compositions flow toward each other, they will intimately coalesce at a transitional zone to form chemical and mechanical bonds. However, except at a transitional zone, properties at locations on the cured article are determined by the melt composition injected thereto in the molding process. In such manner, a single article can be integrally formed and yet have different properties at preselected locations or positions.

Accordingly, it is an object of this invention to provide an improved process of injection molding in which dissimilar resin melts or molding compounds are simultaneously injected into a mold cavity.

Another object of the invention is to provide a method of forming an integrally molded plastic article exhibiting predetermined properties at preselected locations.

A further object of the invention is to provide an improved injection molding process which makes maximum utilization of the chemical and mechanical properties of a select plastic in an article to be produced.

Still other objects and advantages of the invention will in part be obvious and will in part be apparent from the specification.

The invention accordingly comprises the several steps and the relation of one or more of such steps with respect to each of the others thereof, which will be exemplified in the process hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
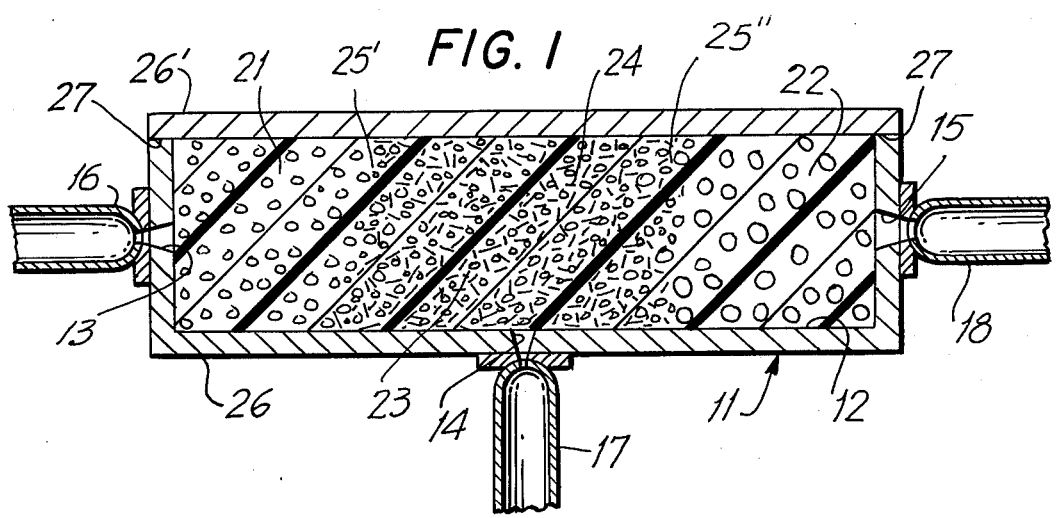
FIG. 1 is a partial sectional view of a mold in which the process of the instant invention is being carried out.

As hereinbefore discussed, plastics having widely varying physical and chemical properties are known in the art and articles formed thereof utilize resins and compositions which provide a plastic having the required properties. Plastics may be selected for their strength, flexibility, resiliency, hardness, insulating properties, etc. Quite often, a particular article formed of plastic may require a combination of properties and it is often the case that a plastic compound will be selected which represents a compromise. For example, it may be desired to produce an article having good insulating properties and having optimum wear resistance and it is often the case that a single compound, modified or unmodified, does not exhibit the optimum characteristics of the two parameters. Generally, a compound will be selected which has moderate relative insulating properties and moderate relative wear resistance resulting in a compromise and a less than optimum article is produced therefrom.

In accordance with the teachings of the instant invention, the optimum qualities desired may be incorporated in an article by selecting dissimilar starting materials and molding an integrally cured and set article therefrom, simultaneously injecting the dissimilar starting materials into the mold at predetermined positions therein and permitting the injections to cool in the mold.

The term dissimilar starting materials as used in this application is used in its broadest sense and means starting materials providing plastics exhibiting specifically different properties. This broad definition includes different plastic generating compositions, such as polypropylene, polyvinylchloride, acrylonitrile-butadiene and like families of compounds, as well as modified members of the same compound family, such as linear polyethylene and branched chain polyethylene. As a further example, styrenes which provide low impact resistant plastic and high impact resistant plastic are within the scope of the definition, and may be considered as dissimilar starting materials. Also within the scope of the definition are compounds which differ from their parents in terms of density, as by fiber reinforcement thereof, for instance with glass fibers, but are otherwise identical thereto.

The term simultaneous molding or simultaneous injection as used in this application is also used in its broadest sense. For example, dissimilar starting materials simultaneously injected may mean that the dissimilar starting materials are injected at the same time or that there is an overlap of cycle time of injection. Also, simultaneous injection is also meant to include a sequence of injection which takes place with sufficient rapidity that the first injected starting material is not permitted sufficient time to cool and set when the second starting material is injected so that the dissimilar starting materials intimately coalesce at a transition zone to form a chemical and/or mechanical bond when they meet within the mold cavity.

In forming an article by the process of simultaneous injection of dissimilar materials, it is preferred to employ as starting materials members of the same family since a chemical bond is formed therebetween for thereby imparting maximum strength to the unitary article. However, protocol specifications for the article may make it desirable to employ as starting materials members of different compound families which mechanically bond, as by lamination, but do not readily chemically bond. While such starting materials may be satisfactorily employed, it is preferred that at least one of the materials include reinforcing fibers which promote intimate coalescence of the starting materials in the transitional zone and thereby increase the strength of the mechanical bond.

For improved understanding of the process of the instant invention, a typical mold cross section is shown in FIG. 1. A mold 11, comprising dies 26 and 26' joined along a parting line 27 (shown in phantom line), defining a mold cavity 12 is provided with three injection ports 13, 14 and 15. Injection ports 13 and 15 are located in parting line 27, while port 14 is substantially perpendicular thereto. An injection barrel 16 communicates with injection port 13, an injection barrel 17 communicates with injection port 14 and an injection barrel 18 communicates with injection port 15. Into mold cavity 12 through each of the injection barrels has been simultaneously injected three dissimilar starting materials. By way of example, the three materials shown are, for instance, a polyurethane but each is of different density with respect to the other two polyurethanes and one of the polyurethanes is reinforced with glass fibers. For example, the polyurethane injected through injection barrel 16 and indicated generally at 21 may have a density of 0.7. The polyurethane injected through injection barrel 18 and indicated at 22 may have a density of 0.4. The polyurethane injected through injection barrel 17 and indicated at 23 may have a density of 0.9 and be interspersed with glass filaments 24. The starting materials 21, 22 and 23 have been simultaneously injected into mold cavity 12 and the set plastics generally adjacent their respective injection barrels will precisely exhibit the properties of the injected starting material. However, between each pair of dissimilar materials, a transitional zone will be defined. The transitional zone indicated generally at 25 is the zone where a random mixing and intimate coalescence of the dissimilar starting materials takes place as a result of the fact that the starting materials intermix under injection pressure while fluidic. In the transitional zone, a chemical and/or mechanical bond will be formed resulting in an integrated, unitary article. However, the material at the transitional zone will exhibit intermediate properties of the two starting materials which meet in the transitional zone. For example, the density of the material at transitional zone 25' will be between 0.7 and 0.9, while the material at the transitional zone 25'' will have a density between 0.4 and 0.9. Also, the material at each transitional zone will be reinforced by glass filaments 24 although the number of glass filaments per cubic measure of the plastic material will be less than in the reinforced starting material 23.

It will thus be understood that the article formed by the injection molding process described in connection with FIG. 1 will exhibit different properties at different locations as a result of density differences therein and the presence or absence of reinforcing filaments. The article, however, will be an integrally molded, one-piece article.

Figure 2:
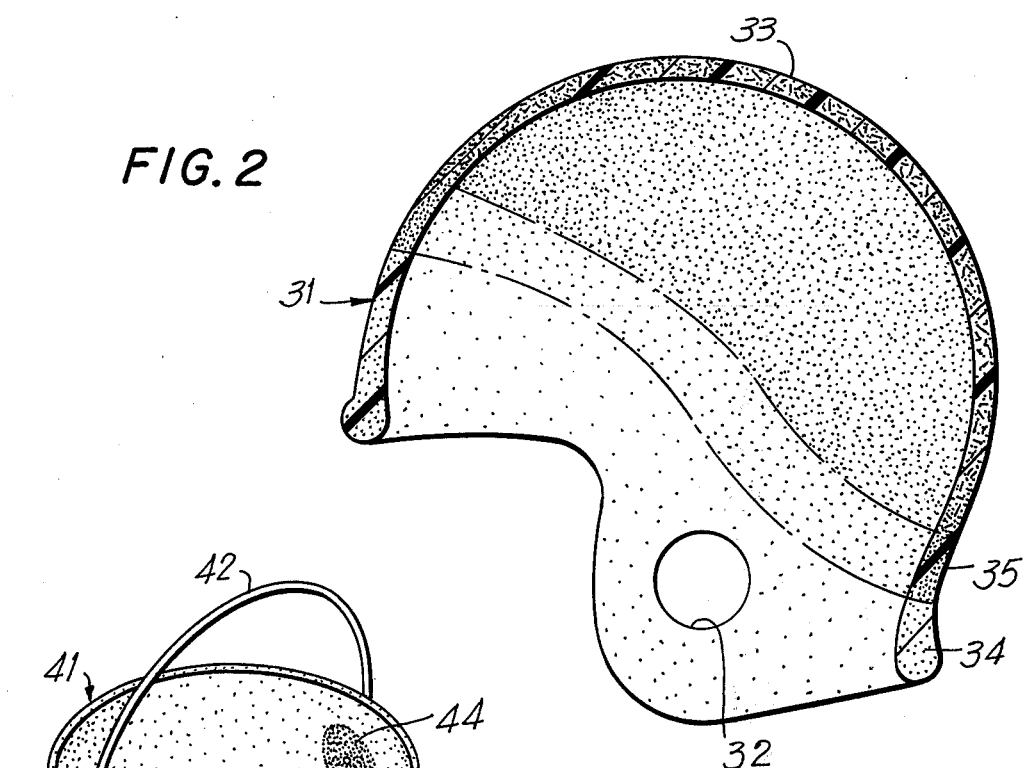
FIG. 2 is a sectional view of a football helmet constructed in accordance with the process of the instant invention.

An example of an article which can make optimum use of the process of the instant invention is shown in FIG. 2. An athletic or football helmet 31 is of the usual shape and includes apertures 32 which are adapted to be disposed opposite the wearer's ears. The helmet 31 is molded in a suitable mold by simultaneous injection of three dissimilar starting materials selected to provide optimum comfort and protection to the wearer. Plastic 33 which must be of substantial rigidity to provide optimum protection for the top and back of the wearer's head would be of high density and preferably fiber reinforced, for instance with glass fibers. Polyvinyl chloride and polyurethane would be suitable for this application. For parts of the helmet covering the back of the neck, the forehead, the temples and the ears, it is desired to have greater flexibility for greater comfort and ease of putting on and removing the helmet. The plastic indicated as 34 may also be a polyvinyl chloride or polyurethane but preferably of lower density and not reinforced. Intermediate plastics 33 and 34 is shown a band of plastic 35 which does not cover critical areas of the head and thus need not be reinforced although it could be formed of the same high density polyvinyl chloride or polyurethane as employed for plastic 33. It will be understood that, between plastics 33 and 35 and between plastics 34 and 35, there are transitional zones which exhibit transition properties of the coalescent starting materials. According to the technique of the instant invention, an athletic helmet is formed as a one-piece article exhibiting different properties being selected in accordance with the uses to which the article will be put at the particular locations.

Figure 3:
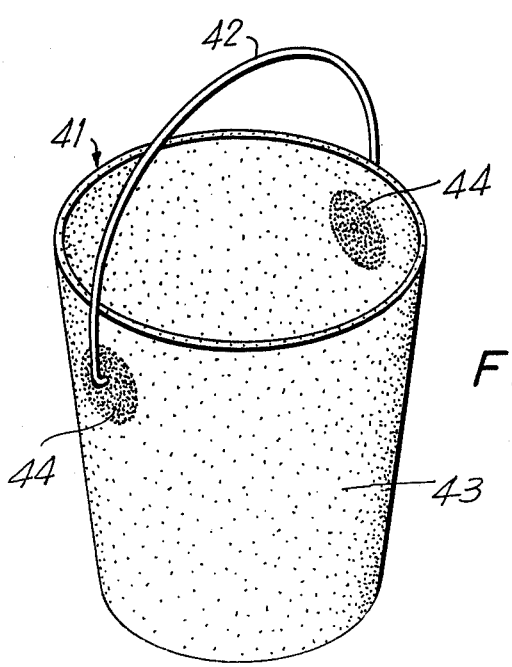
FIG. 3 is a perspective view of a pail constructed in accordance with the process of the instant invention.

Another representative article which may be molded in accordance with the teachings of the instant invention is shown in FIG. 3. A pail or bucket indicated generally at 41 has the usual type of wire handle 42 pivoted thereto. The ends of the wire handle 42 can be journalled in the wall of the bucket. In prior constructions where a less expensive plastic is utilized, it has been common practice to provide separate metal elements attached to the bucket for journalling the ends of the wire handle. While the provision of the separate elements somewhat increases the cost considered the article, it has been con necessary to provide these extra elements as the low density plastic material of which the bucket is fabricated would be insufficient to form a long lasting and satisfactory journal for the ends of the wire handle.

By utilizing the teachings of the instant invention, the wire handle can be journalled directly in the bucket by utilizing a denser and/or fiber reinforced plastic in the areas of the journals without losing the capability of fabricating the remainder of the bucket of a less expensive material. As represented somewhat schematically in FIG. 3, the main body of bucket 41 is injection molded of a first material 43. The areas which define the journals for the ends of wire handle 42 are indicated at 44. Areas 44 would be formed of a material dissimilar with respect to the material of the main body 43 and the material of areas 44 would preferably be denser and/or fiber reinforced as compared with the material of body 43. Using the techniques of the instant invention, the bucket 41 would be injection molded in a suitably designed mold in which the starting material to form the main body 43 would be simultaneously injected with the starting material to form areas 44. Of course, since the volume of starting material required for the main body 43 is substantially greater than the volume required to form areas 44, it will be understood that the sizes ot the injection barrels, the rate of injection, the overlap or non-overlap of cycle time, etc. will be controlled in a predetermined manner so that the of article of FIG. 3 may considered formed in the mold cavity.

By varying the starting materials selected, the volume of starting materials used, injection speed, injection pressure, temperature, etc., an injection molded plastic item can be formed as one-piece by simultaneous injection of dissimilar starting materials with a wide variety of properties at different locations or areas throughout the article. Applications for the instant invention are limitless and there is likewise no restriction on the number of dissimilar starting materials that can be used in a single article. In the article shown in FIG. 2, three plastics are indicated while two plastics are indicated in the article of FIG. 3. The number of starting materials selected will be dictated by the characteristics desired for the injection molded article.

Figure 4:
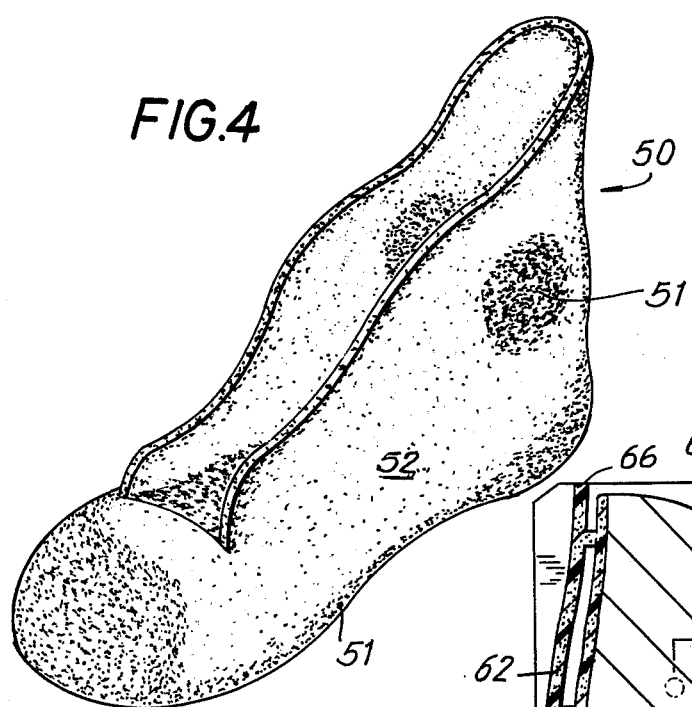
FIG. 4 is a perspective view of a boot constructed in accordance with the process of the instant invention.
Figure 5:
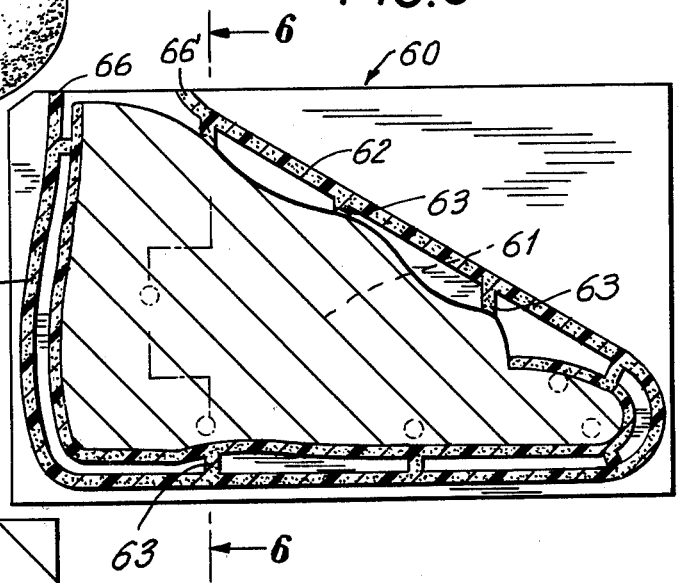
FIG. 5 is a side elevational view of a mold in which the process of the instant invention is carried out for molding the boot depicted in FIG. 4.
Figure 6:
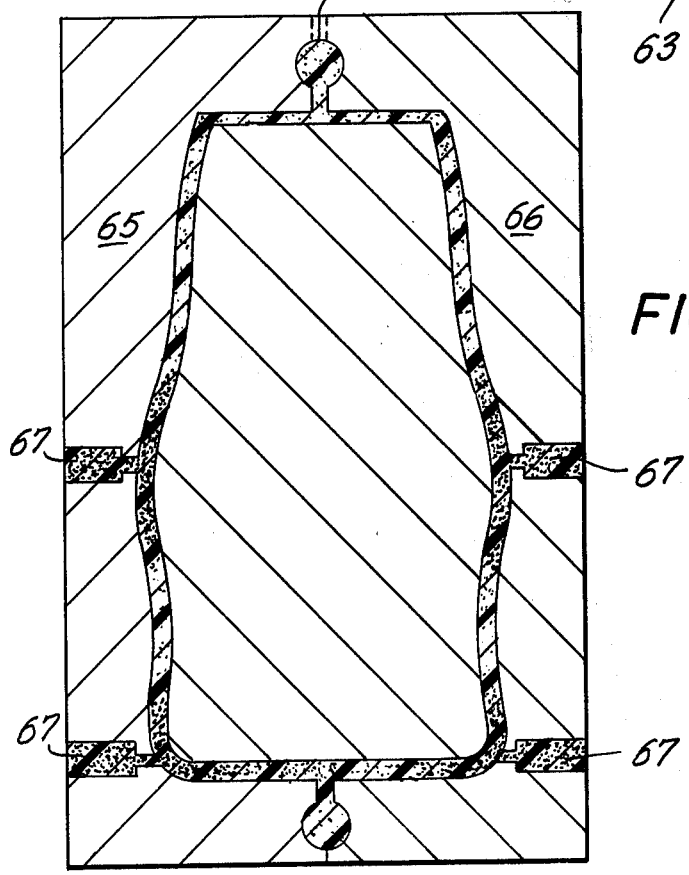
FIG. 6 is a sectional view of the mold depicted in FIG. 5, taken along line 6—6 thereof.

Specific application of the process of the invention, as hereinbefore described, to the fabrication of a boot, for instance, an ice skate boot, is shown in FIGS. 4–6. A boot 50 of conventional shape is molded in mold 60 by simultaneous injection of two dissimilar starting materials. A rim for the heel and sole, and a covering for the toes and ankle bone provided in the boot are molded of abrasion resistant plastic 51 which is dense and preferably fiber reinforced, while the covering sheath of the boot is molded of low density, unreinforced plastic 52. Fiber reinforced and unreinforced polyvinyl chloride or polyurethane may be employed.

As best seen in FIGS. 5 and 6, mold 60 includes mold cavity 61 and runner 62 which communicates therewith through injection ports 63. Runner 62 and injection ports 63 are located in the parting line 64 between a pair of dies 65 and 66 which are engaged to form mold 60. Each die is provided with annular channels which are registered to determine runner 62 and injection ports 63 where the dies are clamped together. A melt which sets to plastic 52 is injected into runner 62 through inlets 66 and 66' and thereby into mold cavity 61 through injection ports 63. Simultaneously therewith, as set forth above, a melt which sets to plastic 51 is injected directly into mold cavity 61 through injection ports 67. In the manner set forth above in detail, the boot is provided with localized areas having specific property characteristics which are integrally joined to the boot sheath through a transition zone of coalescent material.

Figure 7:
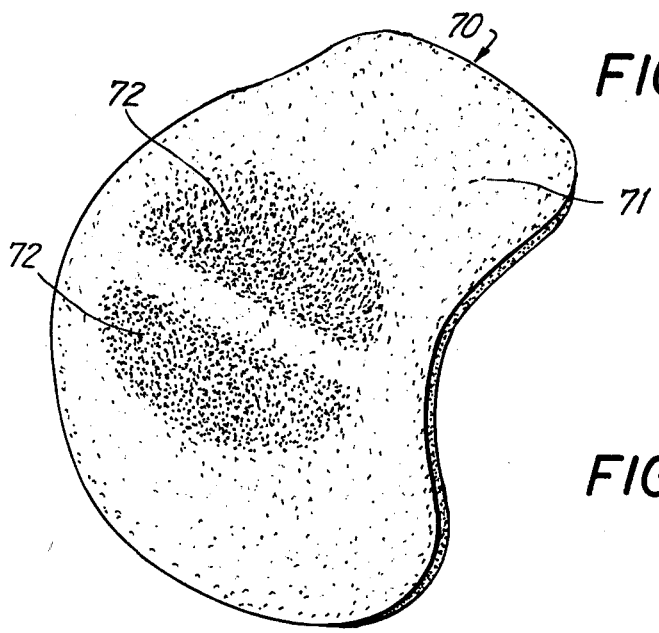
FIG. 7 is a perspective view of a kneeguard constructed in accordance with the process of the instant invention.
Figure 9:
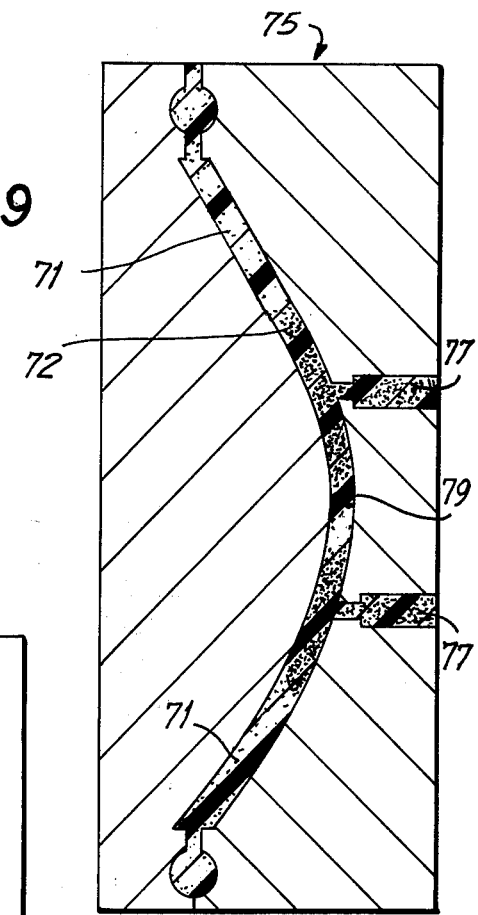
FIG. 9 is a sectional view of the mold depicted in FIG. 8, taken along line 9—9 thereof.
Figure 8:
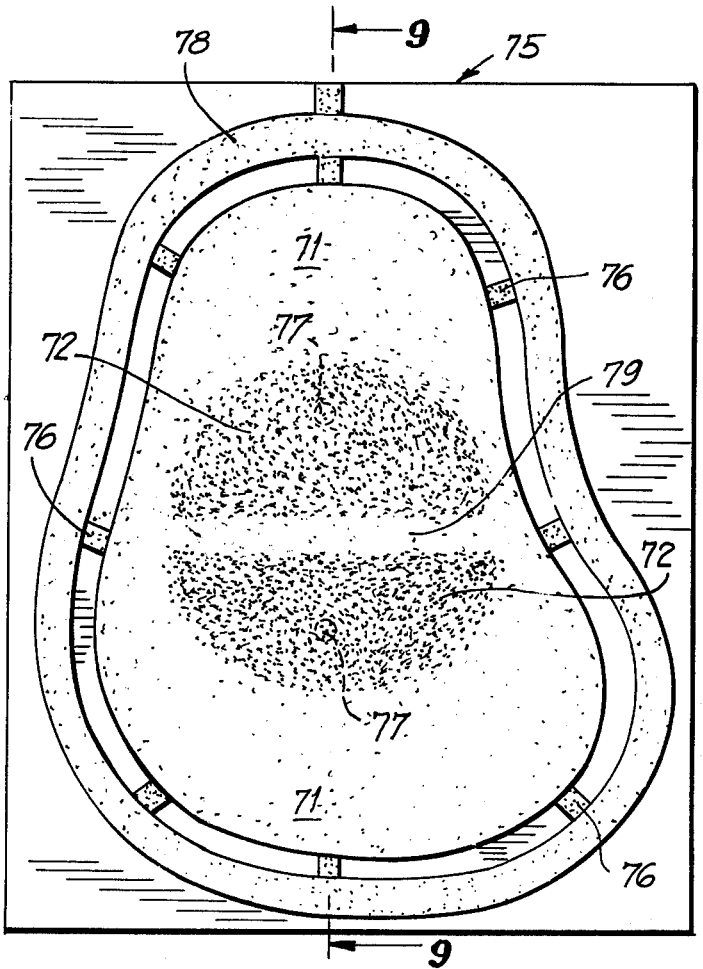
FIG. 8 is a plan view of a mold in which the process of the instant invention is carried out for molding the kneeguard depicted in FIG. 7.

FIGS. 7–9 illustrate another specific application of the process of the invention, as hereinbefore described, to the fabrication of a kneeguard 70 by injecting dissimilar materials into mold 75 through respective ports 76 and 77 for obtaining localized areas of plastic 72 within plastic 71. Plastic 72 is dense, rigid and preferably fiber reinforced, while plastic 71 is low density and unreinforced. In the manner discussed in detail in connection with FIGS. 4–6, the low density material is injected into runner 78 and thereby through ports 76 into mold cavity 79, while the dense material is directly injected into mold cavity 79 through ports 77. In the manner thus described, an integral, one-piece article is fabricated with localized zones having predetermined properties. Localization of plastic zones 72 is achieved by directly injecting the melt therefor into the mold, while the dissimilar material enters the mold through ports associated with runner 78.

Figure 10:
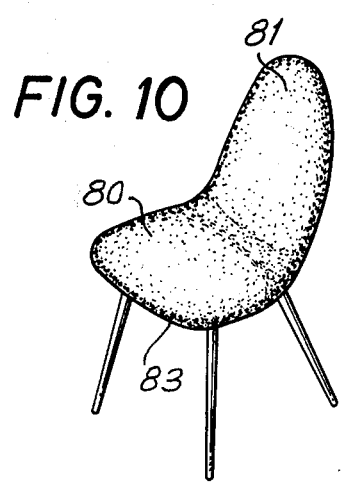
FIG. 10 is a perspective view of a countour chair constructed in accordance with the process of the instant invention.

Referring now to FIG. 10, there is shown yet another article which can make optimum use of the process of the instant invention. A contour chair is of the usual shape and includes integrally connected seat 80 and backrest 81. Rim 83 for the seat and backrest portions of the chair is molded of one plastic, for instance a dense, abrasion resistant composition, while seat 80 and backrest 81 are molded of another, for instance, a low density, flexible composition. The article may be molded according to the process heretofore set forth in detail. It is manifest that innumerable other conventional articles may be fabricated according to the process of the present invention.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An injection molding process comprising injecting a primary melt composition into a mold channel perimetrically surrounding a mold cavity thereof, introducing said primary melt composition, under positive pressure, into said mold cavity from said channel at a plurality of points lying in a plane bisecting said mold cavity, simultaneously injecting a predetermined quantity of at least one secondary melt composition into said mold cavity at a point having a linear projection normal to a plane bisecting said mold cavity, said primary and said at least one secondary melt compositions being characterized by at least one dissimilar property, controlling said injection of said at least one secondary melt composition into said die cavity so as to promote formation of an island thereof within said primary melt composition, controlling said introduction of said primary melt composition into said mold cavity so as to permit said primary melt composition to intimately mix with a continuous peripheral portion of said island of secondary melt composition for thereby promoting formation of a transition zone therebetween and setting said primary and secondary melt compositions and said coalescent transition zone therebetween within said mold cavity so as to form an injection, integrally molded/plastic article of unitary construction exhibiting specific preselected properties at predetermined areas thereof.

2. The injection molding process as claimed in claim 1 including reinforcing said primary melt composition with fibrous material, and accelerating bonding of said reinforced primary melt composition and said at least one secondary melt composition throughout said transition zone therebetween.

3. The injection molding process as claimed in claim 1 including reinforcing said at least one secondary melt composition with fibrous material, and accelerating bonding of said reinforced secondary melt composition with said primary melt composition throughout said transition zone.

4. The injection molding process as claimed in claim 1 including injecting a major proportion of said primary melt composition into said mold cavity.

5. The injection molding process as claimed in claim 1 including injecting a minor proportion of said secondary melt composition into said mold cavity at predetermined locations therein.

6. The injection molding process as claimed in claim 1 wherein said primary and secondary melt compositions coalesce to form a chemical bond in said transition zone therebetween.

7. The injection molding process as claimed in claim 1 wherein said primary and secondary melt compositions mechanically bond in the transition zone therebetween.

* * * * *